(12) United States Patent
Shim (10) Patent No.: US 11,799,308 B2
(45) Date of Patent: Oct. 24, 2023

(54) SYSTEM AND METHOD OF PROVIDING CONTROL SERVICE FOR TVWS-BASED HYBRID ENERGY STORAGE APPARATUS

(71) Applicant: KYUNGIL GREEN TECH CO., LTD., Chungcheongnam-do (KR)

(72) Inventor: Eon-Kyu Shim, Gyeonggi-do (KR)

(73) Assignee: KYUNGIL GREEN TECH CO., LTD., Chungcheongnam-do (KR)

( * ) Notice: Subject to any disclaimer, the term of this patent is extended or adjusted under 35 U.S.C. 154(b) by 396 days.

(21) Appl. No.: 17/107,497

(22) Filed: Nov. 30, 2020

(65) Prior Publication Data
US 2022/0173602 A1 Jun. 2, 2022

(51) Int. Cl.
*H02J 7/00* (2006.01)
*H02J 7/34* (2006.01)
(Continued)

(52) U.S. Cl.
CPC .......... *H02J 7/0068* (2013.01); *H02J 7/0013* (2013.01); *H02J 7/00032* (2020.01); *H02J 7/345* (2013.01);
(Continued)

(58) Field of Classification Search
CPC .................................................. H02J 7/0068
(Continued)

(56) References Cited

U.S. PATENT DOCUMENTS

| | | | |
|---|---|---|---|
| 2012/0046795 A1* | 2/2012 | Kelty .................... | B60L 58/16 700/291 |
| 2013/0109443 A1* | 5/2013 | Eaton ................ | H04W 52/0296 455/572 |

(Continued)

FOREIGN PATENT DOCUMENTS

KR    10-01670848    10/2016

*Primary Examiner* — Yalkew Fantu
(74) *Attorney, Agent, or Firm* — Intellectual Property Law Group LLP (57) ABSTRACT

The present invention provides a system of providing a control service for a TVWS-based hybrid energy storage apparatus in which DC power generated based on solar power is charged into a hybrid solar energy storage device including a plurality of supercapacitors, batteries, supercapacitor modules and battery modules, and the power is supplied to a plurality of loads using the charged power. The system includes: a data collection unit configured to collect storage voltage data for the respective supercapacitors, batteries, supercapacitor modules, and battery modules in the hybrid energy storage apparatus and power consumption data of each load; a central control unit configured to transmit the data collected by the data collection unit through a TVWS channel; a TVWS gateway connected to the hybrid energy storage apparatus through the TVWS channel to receive the data collected by the data collection unit and transmit the data through a wireless communication network; and a control server which is connected to the TVWS gateway to receive the data, and based on the received data, generate control data for the hybrid energy storage apparatus related to amounts of power charge and discharge of the respective supercapacitors and batteries and power consumption data of each of the loads to provide the data to a manager side device.

12 Claims, 4 Drawing Sheets

(51) Int. Cl.
*H04Q 9/00* (2006.01)
*H02J 7/35* (2006.01)

(52) U.S. Cl.
CPC ................. *H02J 7/35* (2013.01); *H04Q 9/00* (2013.01); *H02J 2207/50* (2020.01); *H04Q 2209/10* (2013.01); *H04Q 2209/40* (2013.01)

(58) Field of Classification Search
USPC ........................................................ 320/101
See application file for complete search history.

(56) References Cited

U.S. PATENT DOCUMENTS

| | | | | |
|---|---|---|---|---|
| 2013/0147421 | A1* | 6/2013 | Shin | H02J 3/14 320/101 |
| 2018/0076644 | A1* | 3/2018 | Qureshi | H01M 16/00 |
| 2019/0011970 | A1* | 1/2019 | Youn | G06F 1/3212 |

* cited by examiner

SYSTEM AND METHOD OF PROVIDING CONTROL SERVICE FOR TVWS-BASED HYBRID ENERGY STORAGE APPARATUS

BACKGROUND OF THE INVENTION

1. Field of the Invention

The present invention relates to a system and method of providing a control service for a TVWS-based hybrid energy storage apparatus.

2. Description of the Related Art

In general, worldwide climate change is due to the accelerated environmental pollution caused by the use of fossil fuel energy.

Thereby, the Kyoto Protocol has recently come into force to prevent global warming, and as a result, the development of techniques using new renewable energy for suppressing carbon dioxide emissions is rapidly emerging as an urgent task.

Under such circumstances, the direction of technical development is focusing on the development of new renewable energy using natural energy such as wind power, tidal power, solar power, hydropower and the like. Further, developments are also actively being undertaken in a direction of minimizing an energy loss rate by improving energy systems or devices, which is treated as a loss in an energy storage system for storing new renewable energy as well as regenerative energy generated during braking in a vehicle or electric vehicle.

In particular, recently, in order to provide various services using the energy storage system, studies on a hybrid energy storage apparatus capable of increasing an energy density and rapidly charging a battery have been actively conducted.

In addition to these studies, there is high interest in a control service for a hybrid energy storage apparatus in order to stably provide various services using the hybrid energy storage apparatus.

PATENT DOCUMENT (Patent Document 0001) Korean Patent Registration No. 10-01670848 (registered on Oct. 25, 2016).

SUMMARY OF THE INVENTION

An object of the present invention is to provide a system and method of providing a control service for a TVWS-based hybrid energy storage apparatus, which are capable of providing a control service corresponding to charging/discharging states of a hybrid energy storage apparatus based on storage voltage data received from the hybrid energy storage apparatus including supercapacitors and batteries and power consumption data of each load.

In addition, another object of the present invention is to provide a system and method of providing a control service for a TVWS-based hybrid energy storage apparatus, which are capable of generating a power charging/discharging policy based on data received from the hybrid energy storage apparatus, and then controlling a charging/discharging policy for the hybrid energy storage apparatus on the basis of the generated policy.

Further, another object of the present invention is to provide a system and method of providing a control service for a TVWS-based hybrid energy storage apparatus, which are capable of controlling power supplied to each load by a hybrid energy storage apparatus based on data received from the hybrid energy storage apparatus.

According to an aspect of the present invention, there is provided a system of providing a control service for a TVWS-based hybrid energy storage apparatus in which DC power generated based on solar power is charged into a hybrid solar energy storage device including a plurality of supercapacitors, batteries, supercapacitor modules and battery modules, and the power is supplied to a plurality of loads using the charged power, the system including: a data collection unit configured to collect storage voltage data of the respective supercapacitors, batteries, supercapacitor modules, and battery modules in the hybrid energy storage apparatus and power consumption data of each load; a central control unit configured to transmit the data collected by the data collection unit through a TVWS channel; a TVWS gateway connected to the hybrid energy storage apparatus through the TVWS channel to receive the data collected by the data collection unit and transmit the data through a wireless communication network; and a control server connected to the TVWS gateway to receive the data, and configured to generate control data for the hybrid energy storage apparatus related to amounts of power charge and discharge of the respective supercapacitors and batteries and power consumption data of each of the loads based on the received data, and provide the data to a manager side device.

According to an embodiment of the present invention, the control server may include a power charging/discharging policy determination unit configured to determine a power charging/discharging policy for the hybrid energy storage apparatus based on the amounts of power charge and discharge and power consumption data for each time zone based on the received data, and then transmit the determined policy to the hybrid energy storage apparatus through the TVWS gateway, and the central control unit may control a charging/discharging policy for the respective supercapacitors, batteries, supercapacitor modules, and battery modules of the hybrid energy storage apparatus based on the power charging/discharging policy.

According to an embodiment of the present invention, the power charging/discharging policy determination unit may generate a power discharging policy or power charging policy based on end-of-battery charge and discharge voltages of the respective supercapacitors, batteries, supercapacitor modules, and battery modules in the hybrid energy storage apparatus.

According to an embodiment of the present invention, the hybrid energy storage apparatus may further include: a power supply control unit which has a plurality of connection terminals to which each of the loads is connected, and is configured to supply the power stored in the hybrid energy storage unit to each of the loads connected to the plurality of connection terminals; and a switching unit including switching elements installed between the plurality of connection terminals and each of the plurality of loads and configured to turn on or off power supply according to control of the central control unit, the control server may further include a switching policy determination unit configured to calculate importance of each of the plurality of loads for each time zone based on the received data, generate switching policy information for each time zone based on the calculated importance, and then transmit the information to the hybrid energy storage apparatus through the TVWS gateway, wherein the central control unit may perform control on each switching element of the switching unit based on the switching policy information for each time zone.

According to an embodiment of the present invention, a load requiring a charging service may be connected to at least one or more of the plurality of connection terminals, and when the load is connected to the connection terminal for the charging service, the central control unit may perform switching control on the switching elements in the switching unit based on the amount of power charge stored in the hybrid energy storage apparatus.

According to an embodiment of the present invention, when reaching a non-generation time zone in which solar power generation is not performed according to power generation conditions for solar power, the switching policy determination unit may generate non-generation time zone switching policy information based on the amount of power charge calculated based on the received data and past power consumption data for the non-generation time zone, and then transmit the information to the hybrid energy storage apparatus through the TVWS gateway, and the central control unit of the hybrid energy storage apparatus may control the switching elements in the switching unit based on the switching policy information for the non-generation time zone.

According to an embodiment of the present invention, the hybrid energy storage apparatus may include a beacon transmitter for information transmission configured to broadcast information received from the TVWS gateway through near field wireless communication, and the control server may transmit information including whether a charging service is possible using the amount of power charge in the hybrid energy storage apparatus calculated based on the received data to the hybrid energy storage apparatus through the TVWS gateway, so as to be broadcasted through the beacon transmitter for information transmission.

According to another aspect of the present invention, there is provided a method of providing a control service for a TVWS-based hybrid energy storage apparatus in which DC power generated based on solar power is charged into a hybrid solar energy storage device including a plurality of supercapacitors, batteries, supercapacitor modules and battery modules, and the power is supplied to a plurality of loads using the charged power, the method including: by the hybrid energy storage apparatus, collecting storage voltage data of the respective supercapacitors, batteries, supercapacitor modules, and battery modules and power consumption data of each load, and transmitting the collected data to a TVWS gateway connected to the hybrid energy storage apparatus through a TVWS channel; by a control server connected to the TVWS gateway through a wireless communication network, receiving data collected by the hybrid energy storage apparatus; generating control data related to amounts of power charge and discharge of the hybrid energy storage apparatus and power consumption data of each of the loads based on the received data, and providing the data to a manager side device.

According to an embodiment of the present invention, the method may further include: by the control server, determining a power charging/discharging policy for the hybrid energy storage apparatus based on the amounts of power charge and discharge and power consumption data for each time zone based on the received data, and then transmitting the determined policy to the hybrid energy storage apparatus through the TVWS gateway; and by the hybrid energy storage apparatus, controlling a charging/discharging policy for the respective supercapacitors, batteries, supercapacitor modules, and battery modules of the hybrid energy storage apparatus using the power charging/discharging policy.

According to an embodiment of the present invention, the power charging/discharging policy may be determined based on end-of-battery charge and discharge voltages of the respective supercapacitors, batteries, supercapacitor modules, and battery modules in the hybrid energy storage apparatus.

According to an embodiment of the present invention, the hybrid energy storage apparatus may include: a power supply control unit which has a plurality of connection terminals to which each of the loads is connected, and is configured to supply the power stored in the hybrid energy storage apparatus to each of the loads connected to the plurality of connection terminals; and a switching unit including switching elements installed between the plurality of connection terminals and each of the plurality of loads and configured to turn on or off power supply by a switching operation, and the method may further include: by the control server, calculating importance of each of the plurality of loads for each time zone based on the received data, generating switching policy information for each time zone based on the calculated importance, and then transmitting the information to the hybrid energy storage apparatus through the TVWS gateway; and, by the hybrid energy storage apparatus, performing control on each switching element of the switching unit based on the switching policy information for each time zone.

According to an embodiment of the present invention, the method may further include: when a load requiring a charging service is connected to at least one of the plurality of connection terminals, performing switching control on the switching elements in the switching unit based on the amount of power charge stored in the hybrid energy storage apparatus.

According to an embodiment of the present invention, the method may further include: by the control server, when reaching a non-generation time zone in which solar power generation is not performed according to power generation conditions for solar power, generating non-generation time zone switching policy information based on the amount of power charge calculated based on the received data and past power consumption data for the non-generation time zone, and then transmitting the information to the hybrid energy storage apparatus through the TVWS gateway; and by the hybrid energy storage apparatus, controlling the switching elements in the switching unit based on the switching policy information for the non-generation time zone.

According to an embodiment of the present invention, the method may further include: by the control server, transmitting information including whether a charging service is possible using the amount of power charge in the hybrid energy storage apparatus calculated based on the received data to the hybrid energy storage apparatus through the TVWS gateway; and by the hybrid energy storage apparatus, broadcasting the received information through a beacon transmitter for information transmission, which is configured to broadcast information through near field wireless communication.

According to the above-described embodiments of the present invention, by providing a control service corresponding to the charging/discharging states of the hybrid energy storage apparatus based on storage voltage data received from the hybrid energy storage apparatus including the supercapacitors and the batteries and power consumption data of each load, it is possible to stably supply power to each load using the hybrid energy storage apparatus.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, specific embodiments of the present invention will be described with reference to the accompanying drawings. The following detailed description is provided to contribute to a comprehensive understanding of a method, apparatus, and/or system described herein. However, these embodiments merely illustrative examples, and the present invention is not limited thereto.

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present disclosure into account and can be changed according to the custom or intention of users or operators. Therefore, definition of the terms should be made according to the entire disclosure set forth herein. In addition, the terminology used herein is for the purpose of describing particular embodiments only and is not intended to limit the present invention thereto. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Hereinafter, a system and method of providing a control service for a TVWS-based hybrid energy storage apparatus will be described with reference to the accompanying drawings.

Figure 1:
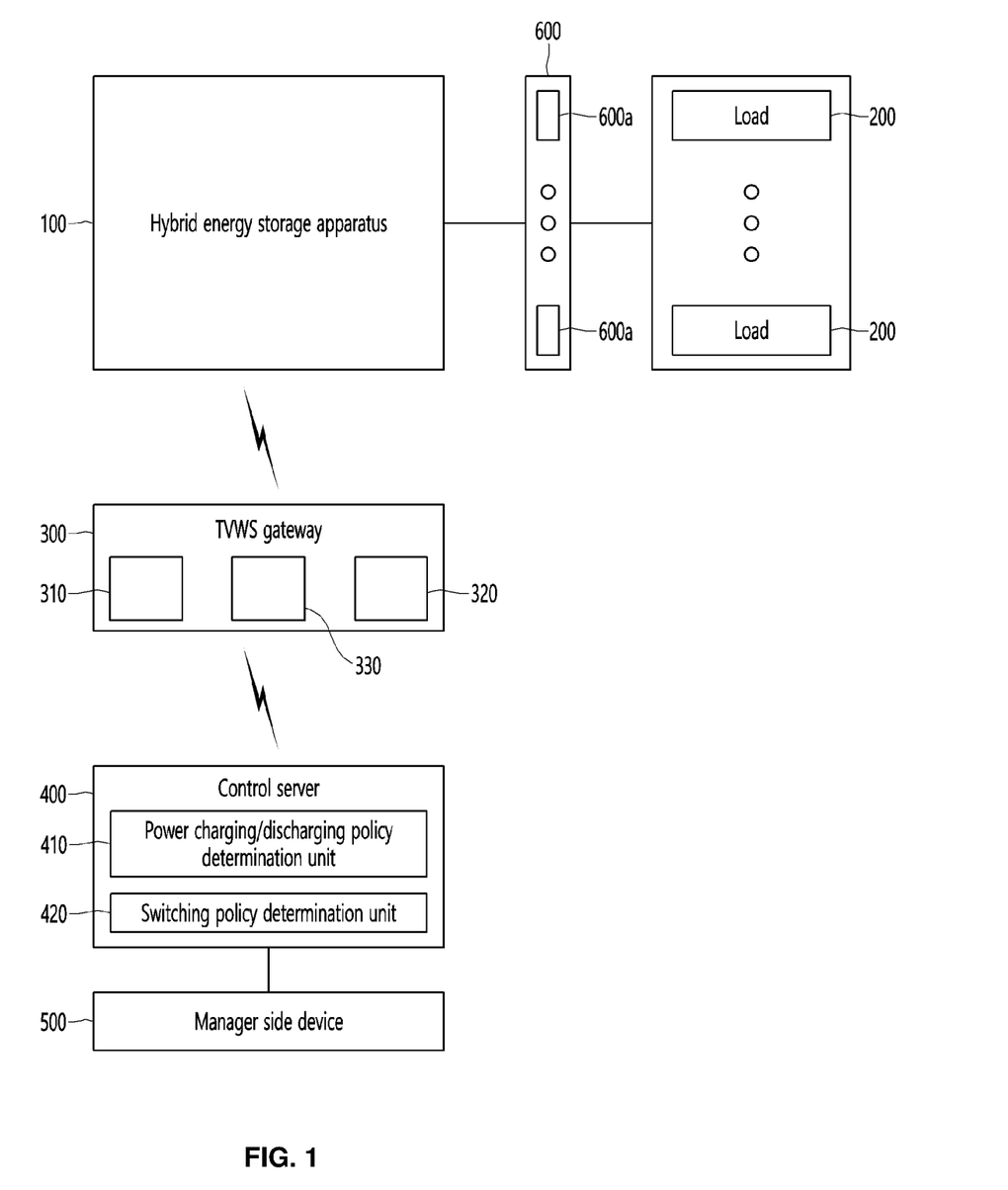
FIG. 1 is a block diagram illustrating an entire configuration of a control service providing system for a TVWS-based hybrid energy storage apparatus according to an embodiment of the present invention.
Figure 2:
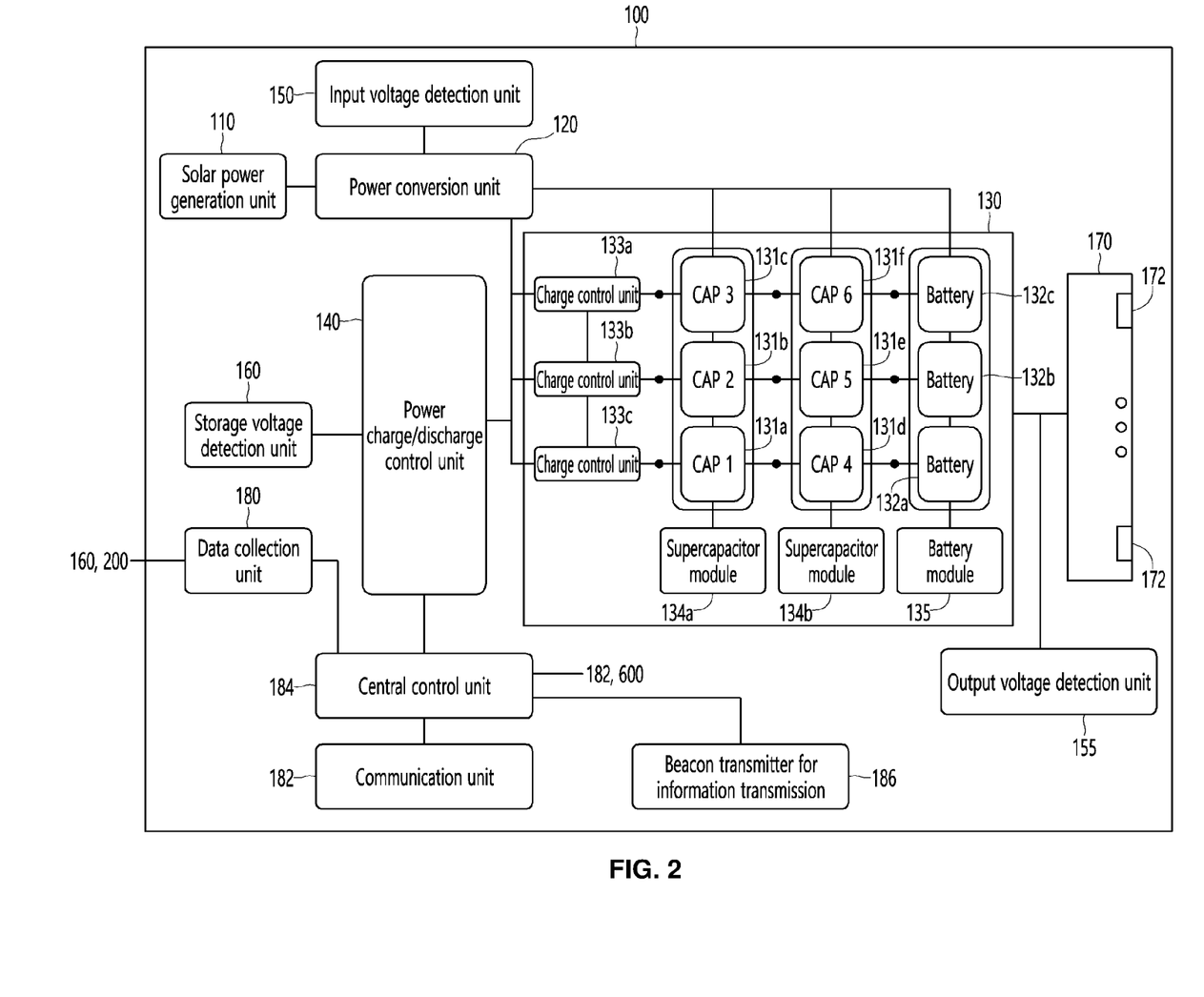
FIG. 2 is a block diagram illustrating a configuration of a hybrid energy storage apparatus applied to the control service providing system according to the embodiment of the present invention.

FIG. 1 is a diagram illustrating an entire configuration of a control service providing system for a TVWS-based hybrid energy storage apparatus according to an embodiment of the present invention, and FIG. 2 is a block diagram illustrating a configuration of a hybrid energy storage apparatus applied to the control service providing system according to the embodiment of the present invention.

As shown in FIG. 1, the control service providing system may include: a hybrid energy storage apparatus 100; a plurality of loads 200 which are installed in each of facilities (e.g., street lights) and operate by receiving an power charged to the plurality of hybrid energy storage apparatus 100; a TVWS gateway 300 which is connected to the hybrid energy storage apparatus 100 through a TVWS channel to receive data and transmit it to an outside through a wireless communication network, and receive various data through the wireless communication network and transmit it to the hybrid energy storage apparatus 100; and a control server 400 which is connected to the TVWS gateway 300 through the wireless communication network to receive data or transmit the received data.

In an embodiment of the present invention, the hybrid energy storage apparatus 100 may charge DC power generated based on solar power in a hybrid energy storage unit 130 including a plurality of supercapacitors 131a to 131f, supercapacitor modules 134a and 134b, batteries 132a to 132c, and battery module 135, and supply the necessary power to each load 200.

As shown in FIG. 2, such a hybrid energy storage apparatus 100 may include: a solar power generation unit 110 configured to receive solar power and generates DC power; a power conversion unit 120 configured to receive DC power generated from the solar power generation unit 110 and convert it into required power by stepping-up or stepping-down the same; the hybrid energy storage unit 130 including a plurality of supercapacitors 131a to 131f arranged in a matrix having M rows and N columns in order to receive and charge the converted power from the power conversion unit 120, a plurality of batteries 132a to 132c connected to N columns of the respective supercapacitors 131a to 131f to receive and charge the converted power from the power conversion unit 120, a plurality of charge control units 133a to 133c connected to N columns of the respective supercapacitors 131a to 131f to control charging of the respective supercapacitors 131a to 131f and the batteries 132a to 132c, a plurality of supercapacitor modules 134a and 134b connected to M rows of the respective supercapacitors 131a to 131f to charge the power delivered through the respective supercapacitors 131a to 131f, and a battery module 135 connected to the M rows of the respective batteries 132a to 132c to charge the power delivered through the batteries 132a to 132c; a power charge/discharge control unit 140 configured to control driving of the power conversion unit 120 according to characteristics of the power generated by the solar power generation unit 110; and a power supply control unit 170 configured to supply the power charged in the hybrid energy storage unit 130 to each load 200.

In addition, the hybrid energy storage apparatus 100 may include: a power charge/discharge control unit 140 configured to control driving of the power conversion unit 120 according to the power characteristics generated by the solar power generation unit 110 of the hybrid energy storage unit 130; an input voltage detection unit 150 provided at an input terminal of the power conversion unit 120 to detect the input voltage; an output voltage detection unit 155 provided at an output terminal of the power conversion unit 120 to detect an output voltage, a storage voltage detection unit 160 configured to detect voltages of the respective supercapacitors 131a to 131f and the batteries 132a to 132c when charging the power to the hybrid energy storage unit 130 through the power charge/discharge control unit 140 and the power conversion unit 120.

In an embodiment of the present invention, the power charge/discharge control unit 140 may control so as to sequentially charge by selecting from the supercapacitors 131a to 131f having the lowest voltage among the respective supercapacitors 131a to 131f of an X-axis and the batteries 132a to 132c constituting the hybrid energy storage unit 130 based on voltage information detected by the storage voltage detection unit 160, and control driving of the power conversion unit 120 by comparing input voltage which is input from the input voltage detection unit 150 with the output voltage which is input from the output voltage detection unit 155 so as to maintain a maximum power point of the input voltage, as well as control charge control units 133a to 133c of the X-axis.

In addition, the power charge/discharge control unit 140 controls charging and discharging of the hybrid energy storage unit 130 according to characteristics of the power input from the input voltage detection unit 150 and the output voltage detection unit 155 depending on solar power generation conditions of the solar power generation unit 110.

In particular, the power charge/discharge control unit 140 according to the embodiment of the present invention may be controlled by the central control unit 184 to control charging and discharging based on a power charging/discharging policy received from the control server 400.

The power supply control unit 170 of the hybrid energy storage apparatus 100 may control the power supplied to the load 200 according to characteristics of each load 200 operating by receiving power supplied from the hybrid energy storage unit 130.

The load 200 supplied with the power by the hybrid energy storage apparatus 100 may include street lights, a plurality of sensors, a CCTV camera, an electric vehicle, a smartphone, and the like, but it is not limited thereto.

The hybrid energy storage apparatus 100 according to the embodiment of the present may include: a data collection unit 180 configured to collect storage voltage data detected by the storage voltage detection unit 160 and power consumption data of each load 200; a communication unit 182 connected with the TVWS gateway 300 through the TVWS channel; and a central control unit 184 configured to transmit data (i.e., storage voltage data and power consumption data) collected by the data collection unit 180 to the TVWS gateway 300 through the communication unit 182 and receive information transmitted from the control server 400 through the TVWS gateway 300 to control an entire operation of the hybrid energy storage apparatus 100.

The TVWS gateway 300 may connect the hybrid energy storage apparatus 100 and the control server 400 based on the TVWS channel. Specifically, the TVWS gateway 300 may include a TVWS communication modem 310 for connecting with the hybrid energy storage apparatus 100 using the TVWS channel, and a wireless communication modem 320 capable of being connected to a wireless communication network, for example, a wireless communication network such as 2G, 3G, 4G, 5G, etc., or a combination thereof.

In addition, the TVWS gateway 300 includes a location information acquirer 330 configured to acquire location information, such as a GPS receiver, and may perform communication with the hybrid energy storage apparatus 100 through the TVWS communication modem 310, by transmitting the location information acquired by the location information acquirer 330 to the control server 400, and then receiving TVWS channel information from the control server 400 in response thereto.

The control server 400 is connected to the TVWS gateway 300 to receive data, and based on the received data, generate control data related to respective amounts of power charge and discharge of the supercapacitors 131a to 131f and the batteries 132a to 132c of the hybrid energy storage unit 130, and a power consumption of each load 200, then provide the generated data to the manager side device 500.

In addition, the control server 400 may calculate an amount of power charge and a change in the amount of power charge of the supercapacitors 131a to 131f and the batteries 132a to 132c for each time zone based on the received data, and based on the calculated amount of power charge and change in the amount of power charge, detect whether a failure occurs in the respective supercapacitors 131a to 131f and the batteries 132a to 132c of the hybrid energy storage unit 130, then provide it to the manager side device 500.

In addition, the control server 400 may check operation states of each load 200 based on the power consumption data of each load 200 among the received data, and detect a failure of each load, then provide it to the manager side device 500.

In an embodiment of the present invention, the term "provision" as used herein may mean that the control server 400 transmits a message to an arbitrary manager side device 500 through the wireless communication network. Specifically, the provision may refer to transmitting control data to the manager side device 500, or if an occurrence of a failure is detected, transmitting a message corresponding thereto.

In an embodiment of the present invention, the control server 400 may include a power charging/discharging policy determination unit 410 configured to determine a power charging/discharging policy for the hybrid energy storage apparatus 100 based on the amounts of power charge and discharge and power consumption data for each time zone based on the received data, and then transmit the determined policy to the hybrid energy storage apparatus 100 through the TVWS gateway 300. Herein, the charging/discharging policy is related to charging and discharging for the respective supercapacitors 131a to 131f, the batteries 132a to 132c, the supercapacitor modules 134a and 134b, and the battery module 135 in the hybrid energy storage unit 130, and may include information on whether the module, the supercapacitor and the battery need to be charged by any priority, or how much charging is to be performed.

In particular, in the embodiment of the present invention, the power charging/discharging policy determination unit 410 of the control server 400 may establish the power charging/discharging policy based on end-of-battery charge voltage and end-of-battery discharge voltage such as the respective supercapacitors 131a to 131f and the batteries 132a to 132c.

That is, the power charging/discharging policy determination unit 410 may determine the power charging policy and the power discharging policy based on the amounts of power charge and discharge of the respective supercapacitors 131a to 131f and the batteries 132a to 132c, and stores the policy to the hybrid energy storage apparatus 100 by transmitting through the TVWS gateway 300.

The power discharging policy will be described. When the hybrid energy storage apparatus 100 supplies power to each load 200 through discharge using the respective supercapacitors 131a to 131f and the supercapacitor modules 134a and 134b, the power charging/discharging policy determination unit 410 may determine power discharging policy in such a way that, the supercapacitors and the batteries are simultaneously discharged at a point when the storage voltage of the supercapacitors 131a to 131f and the supercapacitor modules 134a and 134b is the same as the end-of-battery charge voltage, and if the storage voltage of the supercapacitors reaches the end-of-battery charge voltage as the supercapacitors and the batteries are simultaneously discharged, discharging of the battery is stopped while allowing only the supercapacitor to be discharged to protect the battery, thereby all the power stored in the hybrid energy storage apparatus 100 is used by allowing the supercapacitor to be continuously discharged.

Next, the power charging policy will be described. The power charging/discharging policy determination unit 410 may determine power charging policy in such a way that, if the storage voltage of the supercapacitor reaches the end-of-battery discharge voltage during charging the supercapacitor, the battery and the supercapacitor are simultaneously charged, and if the storage voltage of the supercapacitor reaches the end-of-battery charge voltage, charging of the battery is stopped so that only the supercapacitor is charged, as well as if the voltage of the supercapacitor reaches the end-of-battery charge voltage of the supercapacitor, charging of the supercapacitor is stopped to wait for discharging.

In an embodiment of the present invention, the end-of-battery charge voltage may refer to a threshold voltage that should not be charged any more, and the end-of-battery discharge voltage may refer to a threshold voltage that should not be discharged any more.

In this case, the central control unit 184 may control the power charge/discharge control unit 140 based on the power charging/discharging policy, so as to control the charging/discharging policy for the hybrid energy storage unit 130, on the basis of characteristics of the input voltage input to the hybrid energy storage unit 130 and the output voltage output from the hybrid energy storage unit 130 according to the solar power generation conditions, and the power charging/discharging policy provided from the control server 400.

According to the embodiment of the present invention as described above, it has been described that the power charging/discharging policy is determined by the control server 400 as an example, but the policy may be determined by the central control unit 184. That is, the central control unit 184 may control the power charging and discharging through the power charge/discharge control unit 140 by determining the power charging/discharging policy based on the storage voltage of the supercapacitors and batteries of the hybrid energy storage unit 130, and the end-of-battery charge voltage and the end-of-battery discharge voltage based on the characteristics of the supercapacitors and batteries.

Meanwhile, in the case of the control service providing system according to the embodiment of the present invention, the voltage charged in the plurality of capacitors 131*a* to 131*f* and the batteries 132*a* to 132*c* may be applied to each load 200 through the power supply control unit 170 in the hybrid energy storage apparatus 100 to operate each load 200.

The power supply control unit 170 may include a plurality of connection terminals 172 to which each load 200 may be connected.

Switching units 600 including switching elements 600*a* for turning on or off the power supplied to each load 200 according to the control of the central control unit 184 may be installed between each of the plurality of connection terminals 172 and each of the plurality of loads 200.

Each of the switching elements 600*a* of the switching unit 600 may operate under the control of the central control unit 184. That is, each switching element 600*a* may be turned on or off according to the control of the central control unit 184 to connect the load 200 with the power supply control unit 170 to supply the power to the load 200, or disconnect the load 200 from the power supply control unit 170 to stop the power supply to the load 200.

Meanwhile, in the embodiment of the present invention, the control server 400 may further include a switching policy determination unit 420 configured to calculate importance for each of the plurality of loads 200 for each time zone on the basis of the power consumption data for each time zone based on the received data, generate switching policy information for each time zone based on the calculated importance, and transmit the information to the hybrid energy storage apparatus 100 through the TVWS gateway 300. In this case, the central control unit 184 may perform control on each switching element 600*a* of the switching unit 600 based on the switching policy information for each time zone.

Meanwhile, devices that can be used through power charging, for example, the load 200 such as a smartphone or an electric vehicle, may be connected to at least one of the plurality of connection terminals 172.

In this case, the central control unit 184 may perform switching control on the switching elements 600*a* in the switching unit 600 based on the amount of power charge stored in the hybrid energy storage unit 130 as the load 200 is connected. To this end, the central control unit 184 according to the embodiment of the present invention may calculate and manage an amount of power charge based on the storage voltage.

Meanwhile, based on the received data, the control server 400 may divide the data into a generation time zone in which solar power generation is performed and a non-generation time zone in which solar power generation is not performed according to the solar power generation conditions, and may manage the power consumption data by the plurality of loads 200 in the non-generation time zone, the amount of power charge in the generation time zone and the like.

The switching policy determination unit 420 may generate switching policy information of the non-generation time zone based on the amount of power charge calculated based on the data received as the time of the non-generation time zone is reached and past power consumption data for the non-generation time zone, and transmit the information to the hybrid energy storage apparatus 100 through the TVWS gateway 300. In this case, the central control unit 184 may control the switching elements 600*a* in the switching unit 600 based on the switching policy information of the non-generation time zone transmitted from the control server 400 as the time of the non-generation time zone is reached.

Meanwhile, the hybrid energy storage apparatus 100 according to the embodiment of the present invention may further include a beacon transmitter 186 for information transmission configured to broadcast the information received from the TVWS gateway 300 through near field wireless communication. That is, the beacon transmitter 186 for information transmission may transmit information within a preset radius through Bluetooth, Bluetooth Le, infrared communication, ultrasonic communication and the like.

At this time, the control server 400 may transmit information including whether charging service is possible, for example, whether charging of an electric vehicle is possible, whether charging of a smartphone is possible, or the like using the amount of power charge in the hybrid energy storage apparatus 100 calculated based on the data received in the non-generation time zone to the hybrid energy storage apparatus 100 through the TVWS gateway 300. In this case, the central control unit 184 may broadcast the received information within a preset radius using the beacon transmitter 186 for information transmission.

As described above, the information broadcasted through the beacon transmitter 186 for information transmission is transmitted to a wireless device through beacon communication between a wireless device (not illustrated) of a user around facility, which is capable of near field wireless communication and the beacon transmitter 186 for information transmission and displayed the received information thereon.

The beacon transmitter 186 for information transmission and the wireless device may be connected with each other through Bluetooth Low energy (Le), Bluetooth, infrared, ultrasonic and WiFi communication.

Meanwhile, in order to provide information providing services including information on whether charging service is possible, switching policy information, and power charging/discharging policy information, the control server 400 may classify the data received from the hybrid energy storage apparatus 100 for each day, season, month, week and weather, and store the same in a database 430. That is, the control server 400 may provide various information providing services based on the data stored in the database 430.

A process of providing a control service by the control service providing system for the TVWS-based hybrid energy storage apparatus according to the embodiment of the present invention as described above will be described with reference to FIGS. 3 and 4.

Figure 3:
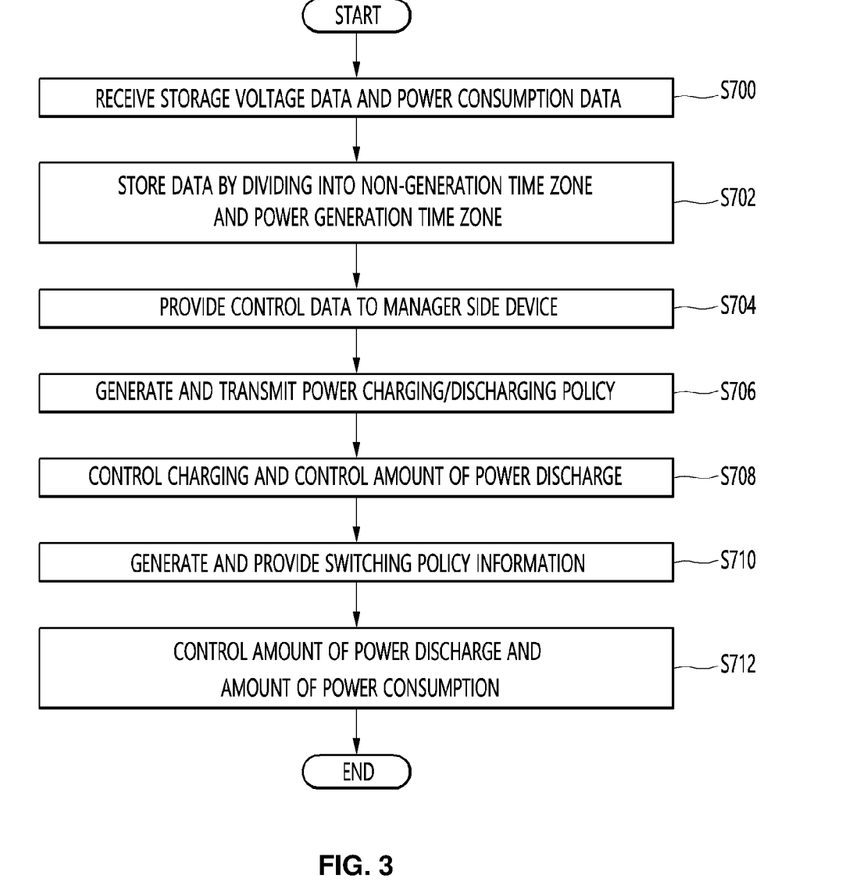
FIG. 3 is a flowchart illustrating a control service providing process for the TVWS-based hybrid energy storage apparatus according to an embodiment of the present invention.

FIG. 3 is a flowchart illustrating a process of providing a control service for the TVWS-based hybrid energy storage apparatus according to the embodiment of the present invention.

As shown in FIG. 3, the control server 400 receives data collected by the hybrid energy storage apparatus 100, for example, storage voltage data of the respective supercapacitors 131*a* to 131*f*, the batteries 132*a* to 132*c*, the supercapacitor modules 134*a* and 134*b*, and the battery module 135, etc. in the hybrid energy storage unit 130, and the power consumption data of each load 200 through the TVWS gateway 300 (S700).

At this time, the control server 400 stores the received data by dividing it into the non-generation time zone and the power generation time zone in the database 430, and based on the received data, provides information on the amounts of power charge and discharge of the hybrid energy storage unit 130 and control data including the power consumption data of each load 200 to the manager side device 500 (S702 and S704).

Then, the control server 400 generates a power charging/discharging policy for the respective supercapacitors 131*a* to 131*f*, the batteries 132*a* to 132*c*, the supercapacitor modules 134*a* and 134*b*, and the battery module 135, etc. of the hybrid energy storage unit 130 based on the storage voltage data of the generation time zone, and transmit the policy to the hybrid energy storage apparatus 100 through the TVWS gateway 300 (S706).

In this case, the control server 400 may generate the power charging/discharging policy based on the past data of the amounts of power charge and discharge in the hybrid energy storage unit 130 stored in the database 430. Specifically, the control server 400 may generate a current power charging/discharging policy based on the past data of the amounts of power charge and discharge in consideration of the current weather, season, and power generation conditions.

The central control unit 184 of the hybrid energy storage apparatus 100, which has received such a power charging/discharging policy, controls charging of the hybrid energy storage unit 130 based on the power charging/discharging policy, and controls the amount of power discharge through the control of the power supply control unit 170 (S708).

Meanwhile, the control server 400 generates switching policy information using the amounts of power charge and discharge of the hybrid energy storage unit 130 and the power consumption data of each load 200 which are calculated based on the received data, and stores the generated switching policy information to the hybrid energy storage apparatus 100 through the TVWS gateway 300 (S710). In this case, the control server 400 may generate switching policy information based on the importance of each load 200 for each time zone.

The central control unit 184 of the hybrid energy storage apparatus 100, which has received the switching policy information, controls the amount of power discharge and the amount of power consumption through switching control for the switching elements 600*a* in the switching unit 600 (S712).

Figure 4:
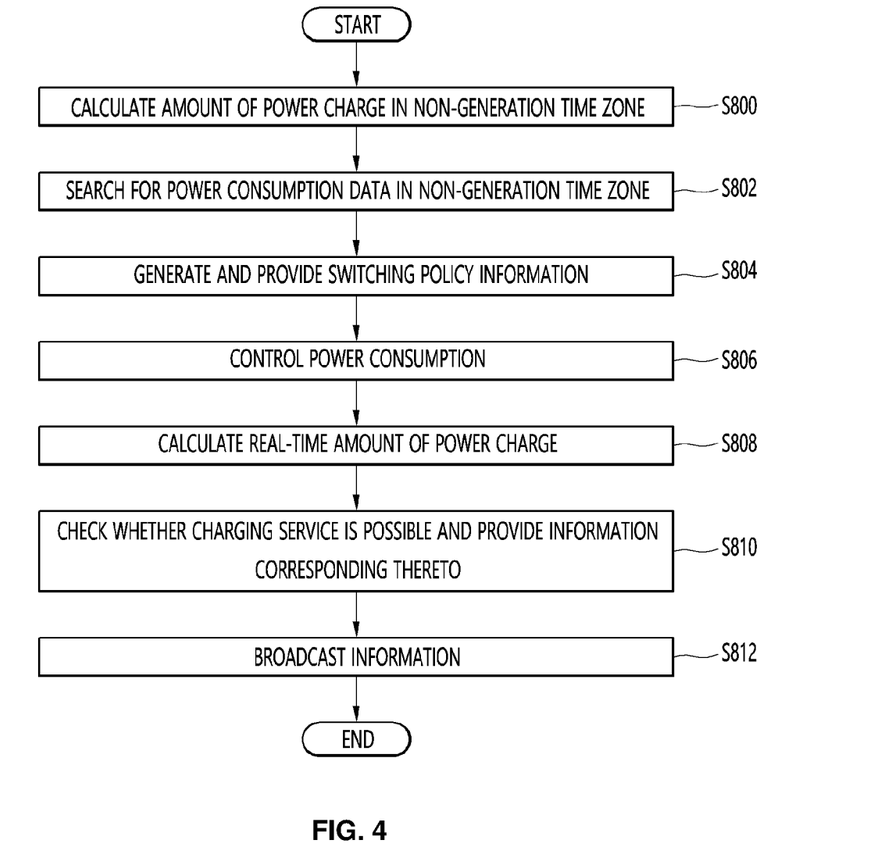
FIG. 4 is a flowchart illustrating a process of providing a control service for each time zone for the TVWS-based hybrid energy storage apparatus according to another embodiment of the present invention.

FIG. 4 is a flowchart illustrating a process of providing a control service for each time zone for the TVWS-based hybrid energy storage apparatus according to another embodiment of the present invention.

Prior to the description of the embodiment of the present invention, the terms "time zone" as used herein may refer to a power generation time zone in which power generation is performed by solar power and a non-generation time zone in which power generation is not performed by the solar power.

As shown in FIG. 4, the control server 400 calculates the current amount of power charge based on the data received through the TVWS gateway 300 when reaching the non-generation time zone (S800).

Thereafter, the control server 400 searches for power consumption data in the non-generation time zone from the database 430 using the current weather and season (S802), and generates switching policy information through comparison between the searched power consumption data and the current amount of power charge, then provides the information to the hybrid energy storage apparatus 100 through the TVWS gateway 300 (S804).

Accordingly, the central control unit 184 of the hybrid energy storage apparatus 100, which has received the switching policy information, controls the power consumption by controlling the amount of power discharge through the switching control for the switching elements 600*a* in the switching unit 600 in the non-generation time zone (S806).

Thereafter, the control server 400 calculates the amount of power charge for the hybrid energy storage apparatus 100 in real time based on the real-time data received through the TVWS gateway 300 (S808).

Then, the control server 400 checks whether a charging service for the hybrid energy storage apparatus 100 is possible based on the amount of real-time power charge, and then provides information corresponding thereto to the hybrid energy storage apparatus 100 through the TVWS gateway 300 (S810).

Thereby, the central control unit 184 broadcasts the information received through the beacon transmitter 186 for information transmission within a preset radius (S812).

The above description is merely illustrative of the technical idea of the present invention, and those skilled art to which the present invention pertains will appreciate that various modifications and variations are possible without departing from the essential characteristics of the present invention. Therefore, the embodiments disclosed in the present invention are intended to describe the technical spirit of the present invention, and are not intended to limit the same, as well as the scope of the technical spirit of the present invention is not limited to these embodiments. It should be understood that the protective scope of the present invention is interpreted by the claims below, and all technical ideas within the equivalent range are included in the scope of the present invention.

DESCRIPTION OF REFERENCE NUMERALS

100: Hybrid energy storage apparatus
110: Solar power generation unit
120: Power conversion unit
130: Hybrid energy storage unit
131a-131f: Supercapacitor
132a-132c: Battery
134a, 134b: Supercapacitor module
135: Battery module
140: Power charge/discharge control unit
150: Input voltage detection unit
155: Output voltage detection unit
160: Storage voltage detection unit
170: Power supply control unit
180: Data collection unit
182: Communication unit
184: Central control unit
186: Beacon transmitter for information transmission
200: Load
300: TVWS gateway
310: TVWS communication modem
320: Wireless communication modem
400: Control server
410: Power charging/discharging policy determination unit
420: Switching policy determination unit
500: Manager side device
600: Switching unit
600a: Switching element

What is claimed is:

1. A system of providing a control service for a TVWS-based hybrid energy storage apparatus in which DC power generated based on solar power is charged into a hybrid solar energy storage device including a plurality of supercapacitors, batteries, supercapacitor modules and battery modules, and the power is supplied to a plurality of loads using the charged power, the system comprising:

a data collection unit configured to collect storage voltage data of the respective supercapacitors, batteries, supercapacitor modules, and battery modules in the hybrid energy storage apparatus and power consumption data of each load;

a central control unit configured to transmit the data collected by the data collection unit through a TVWS channel;

a TVWS gateway connected to the hybrid energy storage apparatus through the TVWS channel to receive the data collected by the data collection unit and transmit the data through a wireless communication network; and a control server connected to the TVWS gateway to receive the data, and configured to generate control data for the hybrid energy storage apparatus related to amounts of power charge and discharge of the respective supercapacitors and batteries and power consumption data of each of the loads based on the received data, and provide the data to a manager side device;

wherein the hybrid energy storage apparatus further comprises:

a power supply control unit which has a plurality of connection terminals to which each of the loads is connected, and is configured to supply the power stored in the hybrid energy storage unit to each of the loads connected to the plurality of connection terminals; and a switching unit including switching elements installed between the plurality of connection terminals and each of the plurality of loads and configured to turn on or off power supply according to control of the central control unit, the control server further comprises a switching policy determination unit configured to calculate importance of each of the plurality of loads for each time zone based on the received data, generate switching policy information for each time zone based on the calculated importance, and then transmit the information to the hybrid energy storage apparatus through the TVWS gateway, wherein the central control unit performs control on each switching element of the switching unit based on the switching policy information for each time zone.

2. The system according to claim 1, wherein the control server comprises a power charging/discharging policy determination unit configured to determine a power charging/discharging policy for the hybrid energy storage apparatus based on the amounts of power charge and discharge and power consumption data for each time zone based on the received data, and then transmit the determined policy to the hybrid energy storage apparatus through the TVWS gateway, and the central control unit controls a charging/discharging policy for the respective supercapacitors, batteries, supercapacitor modules, and battery modules of the hybrid energy storage apparatus based on the power charging/discharging policy.

3. The system according to claim 2, wherein the power charging/discharging policy determination unit generates a power discharging policy or power charging policy based on end-of-battery charge and discharge voltages of the respective supercapacitors, batteries, supercapacitor modules, and battery modules in the hybrid energy storage apparatus.

4. The system according to claim 1, wherein a load requiring a charging service is connected to at least one or more of the plurality of connection terminals, and when the load is connected to the connection terminal for the charging service, the central control unit performs switching control on the switching elements in the switching unit based on the amount of power charge stored in the hybrid energy storage apparatus.

5. The system according to claim 1, wherein, when reaching a non-generation time zone in which solar power generation is not performed according to power generation conditions for solar power, the switching policy determination unit generates non-generation time zone switching policy information based on the amount of power charge calculated based on the received data and past power consumption data for the non-generation time zone, and then transmits the information to the hybrid energy storage apparatus through the TVWS gateway, and the central control unit of the hybrid energy storage apparatus controls the switching elements in the switching unit based on the switching policy information for the non-generation time zone.

6. The system according to claim 1, wherein the hybrid energy storage apparatus comprises a beacon transmitter for information transmission configured to broadcast information received from the TVWS gateway through near field wireless communication, and the control server transmits information including whether a charging service is possible using the amount of power charge in the hybrid energy storage apparatus calculated based on the received data to the hybrid energy storage apparatus through the TVWS gateway, so as to be broadcasted through the beacon transmitter for information transmission.

7. A method of providing a control service for a TVWS-based hybrid energy storage apparatus in which DC power generated based on solar power is charged into a hybrid solar energy storage device including a plurality of supercapacitors, batteries, supercapacitor modules and battery modules, and the power is supplied to a plurality of loads using the charged power, the method comprising:

by the hybrid energy storage apparatus, collecting storage voltage data of the respective supercapacitors, batteries, supercapacitor modules, and battery modules and power consumption data of each load, and transmitting the collected data to a TVWS gateway connected to the hybrid energy storage apparatus through a TVWS channel;

by a control server connected to the TVWS gateway through a wireless communication network, receiving data collected by the hybrid energy storage apparatus;

generating control data related to amounts of power charge and discharge of the hybrid energy storage apparatus and power consumption data of each of the loads based on the received data, and providing the data to a manager side device;

wherein the hybrid energy storage apparatus comprises: a power supply control unit which has a plurality of connection terminals to which each of the loads is connected, and is configured to supply the power stored in the hybrid energy storage apparatus to each of the loads connected to the plurality of connection terminals; and a switching unit including switching elements installed between the plurality of connection terminals and each of the plurality of loads and configured to turn on or off power supply by a switching operation, and further comprising: by the control server, calculating importance of each of the plurality of loads for each time zone based on the received data, generating switching policy information for each time zone based on the calculated importance, and then transmitting the information to the hybrid energy storage apparatus through the TVWS gateway; and by the hybrid energy storage apparatus, performing control on each switching element of the switching unit based on the switching policy information for each time zone.

8. The method according to claim 7, further comprising:
by the control server, determining a power charging/discharging policy for the hybrid energy storage apparatus based on the amounts of power charge and discharge and power consumption data for each time zone based on the received data, and then transmitting the determined policy to the hybrid energy storage apparatus through the TVWS gateway; and by the hybrid energy storage apparatus, controlling a charging/discharging policy for the respective supercapacitors, batteries, supercapacitor modules, and battery modules of the hybrid energy storage apparatus using the power charging/discharging policy.

9. The method according to claim 8, wherein the power charging/discharging policy is determined based on end-of-battery charge and discharge voltages of the respective supercapacitors, batteries, supercapacitor modules, and battery modules in the hybrid energy storage apparatus.

10. The method according to claim 7, further comprising: when a load requiring a charging service is connected to at least one of the plurality of connection terminals, performing switching control on the switching elements in the switching unit based on the amount of power charge stored in the hybrid energy storage apparatus.

11. The method according to claim 7, further comprising:
by the control server, when reaching a non-generation time zone in which solar power generation is not performed according to power generation conditions for solar power, generating non-generation time zone switching policy information based on the amount of power charge calculated based on the received data and past power consumption data for the non-generation time zone, and then transmitting the information to the hybrid energy storage apparatus through the TVWS gateway; and by the hybrid energy storage apparatus, controlling the switching elements in the switching unit based on the switching policy information for the non-generation time zone.

12. The method according to claim 7, further comprising:
by the control server, transmitting information including whether a charging service is possible using the amount of power charge in the hybrid energy storage apparatus calculated based on the received data to the hybrid energy storage apparatus through the TVWS gateway; and by the hybrid energy storage apparatus, broadcasting the received information through a beacon transmitter for information transmission, which is configured to broadcast information through near field wireless communication.

* * * * *